INVENTOR.
ALTEN E. WHITECAR

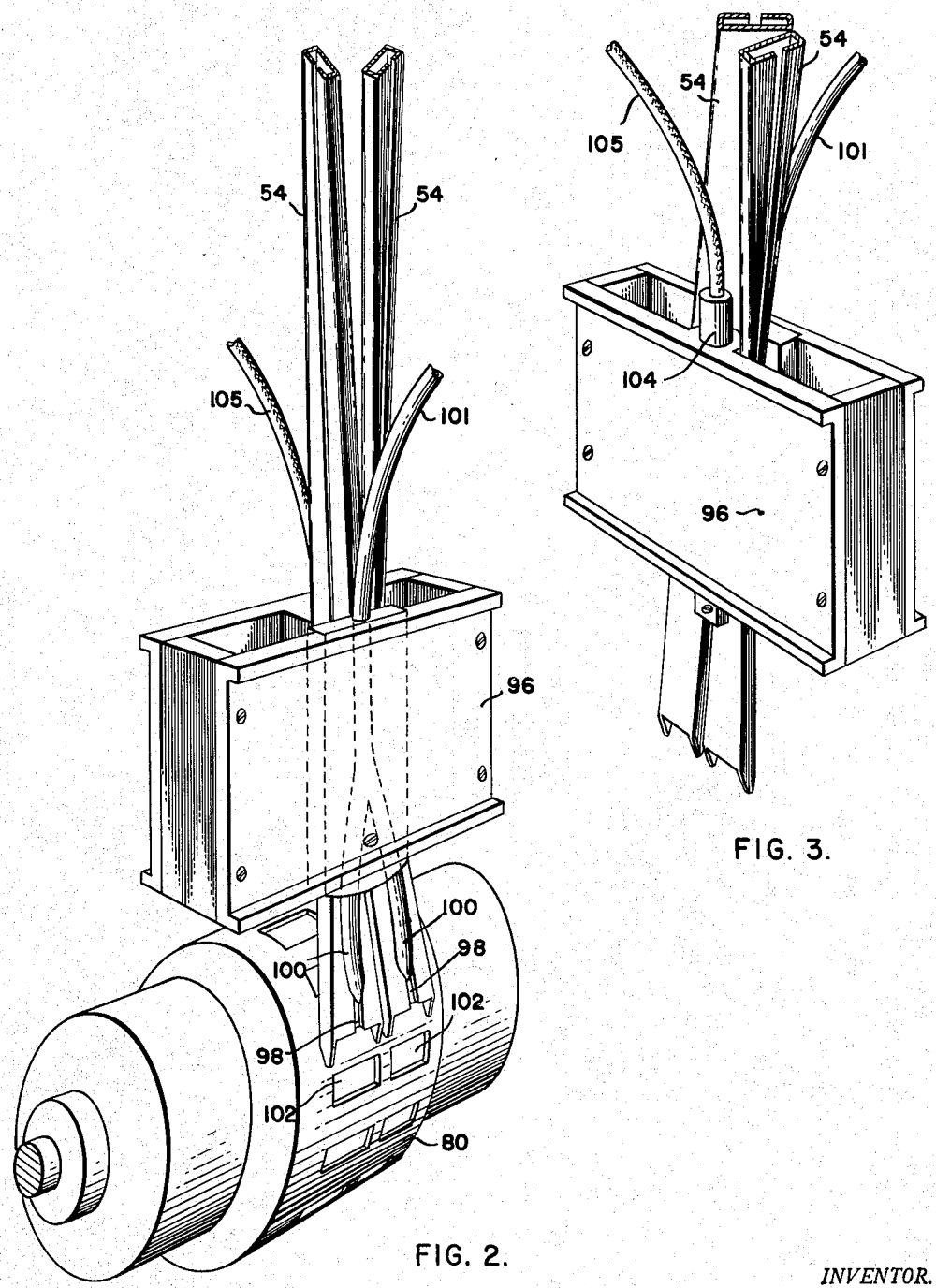

INVENTOR.
ALTEN E. WHITECAR
BY
Busser and Smith
ATTORNEYS

May 29, 1956

A. E. WHITECAR 2,747,351

TAPE SEALING MACHINE FOR PACKAGING
ARTICLES IN THERMOPLASTIC TAPE

Filed Dec. 20, 1951

*INVENTOR.*
ALTEN E. WHITECAR
BY
Busser and Smith

ATTORNEYS

United States Patent Office 2,747,351
Patented May 29, 1956

2,747,351

TAPE SEALING MACHINE FOR PACKAGING ARTICLES IN THERMOPLASTIC TAPE

Alten E. Whitecar, Westville, N. J., assignor to Smith, Kline & French Laboratories, Philadelphia, Pa., a corporation of Pennsylvania Application December 20, 1951, Serial No. 262,564

1 Claim. (Cl. 53—141)

This invention relates to an improved tape sealing machine for packaging articles in thermoplastic tape.

There are certain difficulties incident to the operation of tape sealing machines presently used in the art, specifically machines of the Colton-Dismat type. Among these difficulties are the tendency of tablets, or other objects to be sealed in tape, to collect on the scraper shoe of the sorting wheel, and the tendency of moisture in the air to condense in the ends of the delivery tubes from the sorting wheel, thus forming a pasty restriction from the tablet dust and condensed atmospheric moisture. This restriction causes the tablets to be retarded in the tubes, and to be out of time when they reach the wells in the die rolls. Further, tablets tend to bounce off of certain types of tape, thus causing the tablets to be out of time with the wells in the die rolls. Further, the felt or rubber rolls used to hold the completed strip of sealed tablets taut while they are passed through the cutter, tend to give an uneven pull on the tape and, after a short period of use, become worn so that they no longer function properly.

It is, therefore, an object of this invention to provide an improved tape sealing machine for sealing objects in a strip of thermoplastic tape in which an air jet is directed adjacent to the scraper shoe on the sorting wheel which prevents tablets or other objects from piling up on the scraper shoe and eliminates breakage of the tablets or other objects.

It is a further object of this invention to provide an improved tape sealing machine for sealing objects in a strip of thermoplastic tape in which a heating means is provided adjacent the lower end of the delivery tubes, which warms the tubes, thereby preventing condensation of moisture in the tubes and consequent restriction thereof.

It is a further object of this invention to provide an improved tape sealing machine for sealing objects in a strip of thermoplastic tape in which an air jet is directed into the lower end of the delivery tubes, which aids in forcing the tablet or other object into contact with the tape being fed into the die rolls.

A further object of this invention is to provide an improved tape sealing machine for sealing objects in a strip of thermoplastic tape in which a pair of intermeshed cylindrical brushes revolving together are provided to pull the tape into the cutter with uniform tension, and to eliminate the necessity for replacement of the felt or rubber rolls previously employed.

Referring to the accompanying drawings in which one embodiment of the invention is disclosed:

Figure 2 is a fragmentary perspective view showing one of the die rolls and the delivery tubes, also showing the tape guide and air jet employed in accordance with this invention;

Figure 3 is a perspective view of the delivery tubes and tape guide showing the position of the heating element employed in accordance with this invention;

Figure 1:
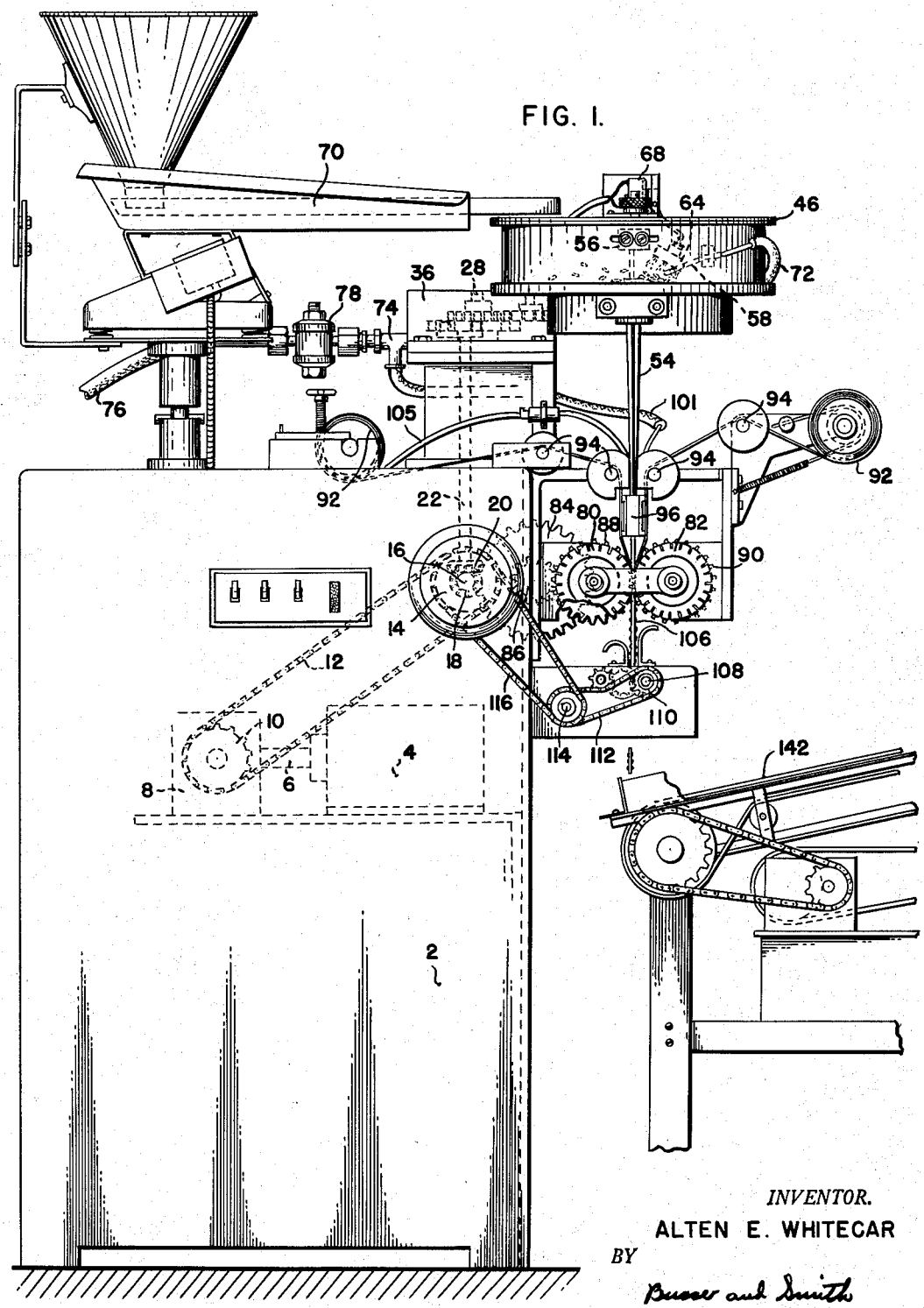
Figure 1 is a side view of the improved tape sealing machine of this invention.

Referring specifically to Figure 1, a modified Colton-Dismat type tape sealing machine is disclosed having a housing 2 in which is mounted an electric drive motor 4, connected by shaft 6 to reduction gear 8. Mounted on reduction gear 8 is a sprocket 10 which drives a chain 12, said chain driving sprocket 14 on shaft 16. Shaft 16 is provided with a bevel gear 18 which meshes with bevel gear 20 on shaft 22.

Figure 8:
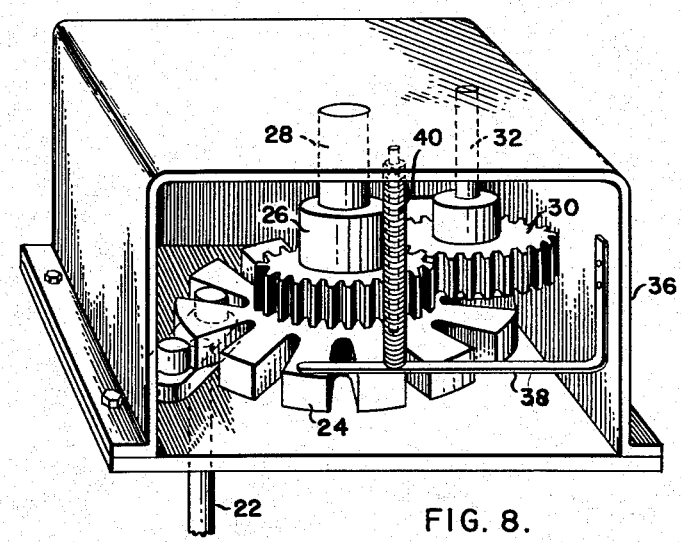
Figure 8 is a perspective view showing the Geneva cam drive to the sorting wheel and brake therefor.

Shaft 22 at its upper end drives Geneva cam 24, as best seen in Figure 8. Geneva cam 24 and gear 26 are fixedly secured to shaft 28. Gear 26 meshes with gear 30, said gear 30 being fixed to shaft 32, said shaft 32 driving rotatable sorting wheel 34 by gearing not shown.

Surrounding Geneva cam 24 is a housing 36 having a spring steel brake 38 secured thereto, said brake 38 being biased against Geneva cam 24 by compression spring 40. The purpose of the spring steel brake 38 is to prevent whipping of the Geneva cam at higher operating speeds.

Figure 4:
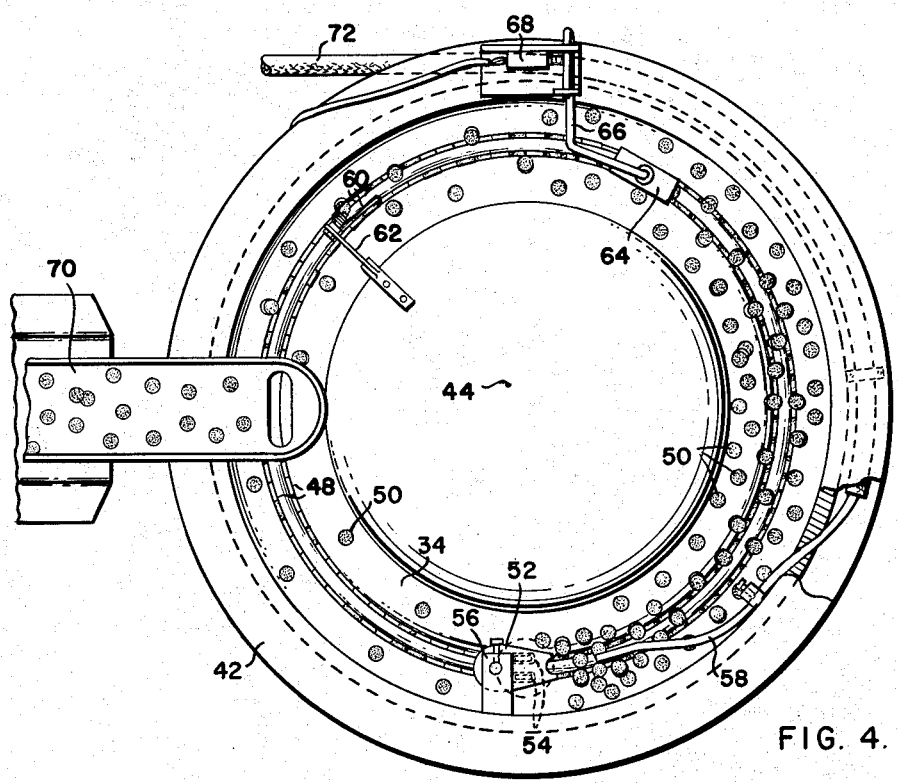
Figure 4 is a top view of the rotatable sorting wheel showing the position of the air jet, spring distributing fingers and a switch for operating the feeder to the sorting wheel.

Referring to Figure 4, a rotatable sorting wheel 34 is enclosed in a stationary casing 42 and has a stationary center hub 44. The sorting wheel is covered by a transparent plastic plate 46, as shown in Figure 1. Referring again to Figure 4, the sorting wheel is provided with two grooves 48 having a plurality of pockets therein for the reception of tablets 50. As sorting wheel 34 rotates, the tablets 50 will be directed into the pockets in grooves 48 and will pass beneath scraper shoe 52 into the tops of delivery tubes 54.

Figure 5:
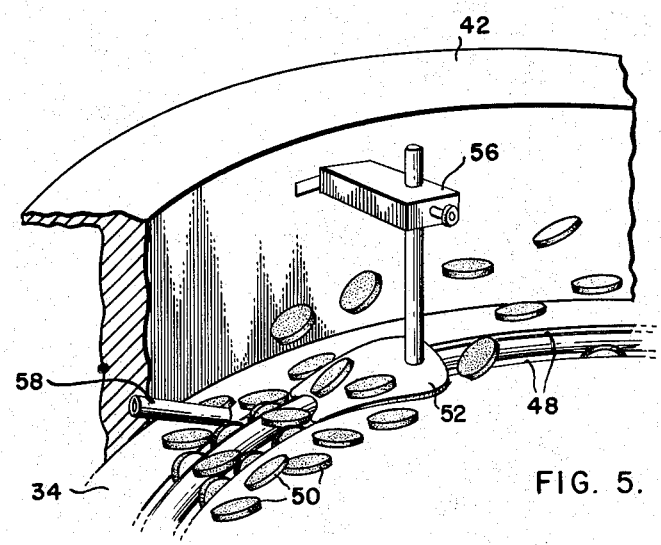
Figure 5 is a fragmentary perspective view of the sorting wheel, showing the position of the air jet relative to the scraper shoe.

As shown in Figure 5, scraper shoe 52 deflects any tablets which are not placed in the pockets in grooves 48, so that they may properly be placed therein by further rotation of the sorting wheel. Scraper shoe 52 is secured to the side of casing 42 by bracket 56. As shown in Figures 4 and 5, an air jet 58 is positioned adjacent to the scraper shoe and points in the direction of rotation of the sorting wheel. The continuously operating air jet prevents the tablets 50 from piling up on the scraper shoe 52 and interfering with the proper placement of the tablets in the grooves 48.

Figure 6:
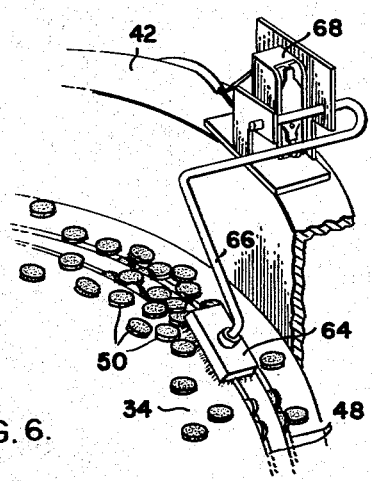
Figure 6 is a fragmentary perspective view showing the mounting of the switch which actuates the feeder to the sorting wheel.
Figure 7:
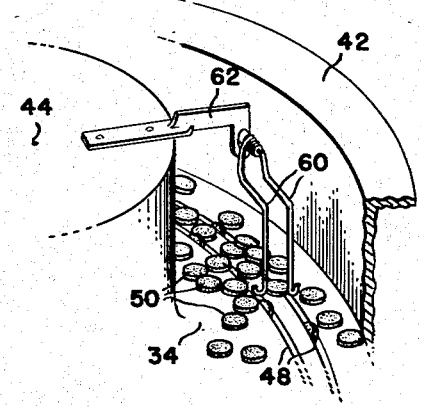
Figure 7 is a fragmentary perspective view showing the mounting of the spring distributing fingers.

As shown in Figures 4 and 7, a pair of depending spring fingers 60 are mounted on the stationary hub 44 by bracket 62 and depend into grooves 48. The spring fingers 60 prevent the tablets 50 from becoming stacked up and jamming the brush 64, shown in Figures 4 and 6.

Brush 64 is mounted on switch arm 66 and if an excessive number of tablets pass beneath brush 64, switch arm 66 is rotated, thus tripping switch 68, which shuts off vibration feeder 70 which is mounted above the rotatable sorting wheel 34. Vibration feeder 70 may be of any conventional type.

As shown in Figures 1 and 4, air jet 58 is connected to line 72, said line 72 being connected to T 74, said T 74 being connected to air line 76 having regulator 78 therein. Line 76 may be connected to any suitable source of compressed air.

Referring again to Figure 1, a pair of die rolls 80 and 82 are mounted on the right-hand side of the housing 2 and are driven from cross shaft 16 by gears 84, 86, 88 and 90. Die roll 80 rotates clockwise and die roll 82 rotates counterclockwise. Die rolls 80 and 82 are heated by means of electric heating elements contained therein. Mounted above die rolls 80 and 82 are two rolls of thermoplastic tape 92. A single layer of tape is taken from each roll and passed over guides 94 and between die rolls 80 and 82.

Referring to Figures 2 and 3, a rectangular tape guide 96 is mounted on the lower end of the delivery tubes 54 above the die rolls, one of which is shown in Figure 2. As will be seen from Figures 2 and 3, the delivery tubes 54 are formed in the shape of rectangular channels and have grooves 98 running the length thereof. A pair of air jets 100 are directed downwardly and into the grooves 98 in delivery tubes 54, for the purpose of forcing tablets downwardly into the pockets 102 in die roll 80, as die roll 80 rotates. Air jets 100 are connected to T 74 by line 101.

As shown in Figure 3, a heating element 104 is mounted in tape guide 96 for the purpose of warming the delivery tubes 54 to prevent condensation therein, and also warms the tape guide 96 which has the effect of conditioning the thermoplastic tape passing over the tape guide 96, and thereby makes it more adapted to receive the tablets passing down the delivery tubes 54 and into the pockets 102 in die roll 80. Electric heating element 104 may be connected to any suitable source of current by line 105.

From the foregoing, it will be appreciated that as the die rolls 80 and 82 rotate, and as the tablets are fed downwardly through delivery tubes 54, and as the two strips of tape are passed between the die rolls on either side of the tablets, the tablets will be enclosed in corresponding pockets in die rolls 80 and 82, and the tape will be sealed around the tablets by the abutting portions of the die rolls 80 and 82.

The formed package of tablets in the sealed tape passes from the die rolls in a continuous strip, as shown at 106.

Mounted below die roll 82 is a rotatable shaft 108 having a sprocket 110 thereon. Sprocket 110 is driven by chain 112 from the sprocket on shaft 114. Shaft 114 is driven by a chain 116 mounted on sprockets on shaft 114 and shaft 16.

Figure 9:
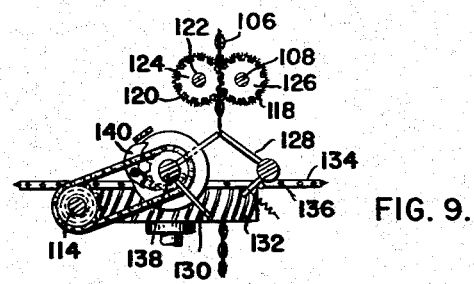
Figure 9 is a fragmentary view showing the mounting of the intermeshed cylindrical brushes above the cutter.

As shown in Figure 9, shaft 108 has a brush 118 mounted thereon which intermeshes with brush 120 on shaft 122. Brush 120 is driven by gear 124 which meshes with gear 126 on shaft 108. Thus it will be seen that the rotation of brushes 118 and 120 serves to pull the continuous package of sealed tablets downwardly below the die rolls and maintains it taut while it is cut by the cutter positioned below the brushes, as shown in Figure 9.

The cutter has a pivotally mounted blade 128 which engages with rotatable blade 130 during one portion of the rotation of blade 130. Gear 132 is rotated by a worm gear on shaft 114 and gear 132 has a circular plate 134 mounted on the top thereof, having a plurality of lugs 136 extending from the periphery thereof. Shaft 138 has a sprocket thereon which is driven by a chain and sprocket from shaft 114 and is provided with a clutch so that knife blade 130 may be rotated while clutch dog 140 is engaged. As plate 134 rotates, the lugs 136 will trip the clutch dog 140 and allow knife blade 130 to make one revolution each time the clutch dog 140 is tripped by one of the lugs 136. A package of desired length will then be cut from the continuous tube of package material by each revolution of the knife blade 130.

Referring again to Figure 1, a conveyor 142 is positioned adjacent the discharge end of the cutter so that the cut packages may be conveyed away to a packaging operation. This conveyor is conventional and constitutes no part of the present invention.

The operation of the device is as follows:

Motor 4 is energized and due to the driving connection between the reduction gear, chain 12 and shaft 16, shaft 22 will be rotated, and will rotate Geneva cam 24. Geneva cam 24 and the driving connection through the gear chain connected to the rotating sorting wheel will rotate the sorting wheel 34. Vibration feeder 70 will feed a quantity of tablets or other objects into the sorting wheel 34, and the tablets will place themselves in the pockets in grooves 48. The difficulty heretofore experienced with tablets piling up on the scraper shoe 52 above the delivery tubes 54 is eliminated by the air jet 58 which keeps the tablets moving past the scraper shoe.

The brush 64 mounted on the switch arm 66 opens the switch 68 connected to the vibration feeder 70, when an excess of tablets passes below the brush 64. The depending spring fingers 60 have a function of spreading the tablets uniformly across the sorting wheel so that one or two tablets are prevented from becoming stacked up and tripping the switch 68 when there are insufficient tablets in the sorting wheel.

The tablets pass down the delivery tubes 54 and are encased between two layers of tape drawn from the rolls 92. The heating element 104 prevents condensation from forming in the lower end of the delivery tubes, thus keeping them free from restriction, and the air jets 100 have the function of forcing the tablets downwardly against the tape so that they do not bounce back up into the delivery tube and leave an empty space in the package. The tape guide 96 becomes warm due to heat transmitted from heating element 104 and this has the desirable effect of conditioning the thermoplastic tape before it passes between the die rolls and makes the tape more adapted to receive the tablets into the pockets 102 in the die rolls 80 and 82.

As the formed package passes from the die rolls 80 and 82, it is gripped by the intermeshing cylindrical brushes 118 and 120, and is pulled downwardly to the cutting mechanism mounted below the brushes, as shown in Figure 9. By the use of brushes instead of the felt or rubber rolls previously used, the necessity for replacement of the felt or rubber rolls is eliminated, since the wear on the brushes is negligibile.

By virtue of the improvements disclosed in the standard Colton-Dismat type sealing machine, it has been found that the rate of production has been substantially increased and the undesirable factor of rectriction of the delivery tubes has been eliminated. Further, the delivery of the tablets in the delivery tubes from the sorting wheel has been greatly facilitated, and the provision of a brush on the switch which actuates the vibration feeder has eliminated the undesirable feature of tablets stacking beneath the switch arm 66 and crushing the tablets. Further, the necessity for replacing the felt or rubber rolls which hold the formed package taut has been eliminated, thereby resulting in greatly improved operation. Also, the provision of air jets adjacent to the lower ends of the delivery tubes results in less rejected packages, since the tablets are forced into the pockets in the die rolls 80 and 82, thus eliminating packages in which blank spaces are left between adjacent tablets.

Any type of thermoplastic tape may be employed with the device of the present invention, and "Cellophane," for example, has been found to be satisfactory. It will be obvious to those skilled in the art that many modifications may be made within the scope of the present invention without departing from the spirit thereof, and the invention is to be restricted only in accordance with the appended claim.

What is claimed is:

In a tape sealing machine adapted for sealing objects in a package of thermoplastic tape and having a channel for feeding a plurality of objects between a pair of die rolls, said channel being exposed to the atmosphere, means for feeding two strips of tape between said die rolls, and tape guiding means adjacent said channel, the improvement which comprises heating means mounted adjacent the discharge end of said channel and said tape guiding means whereby condensation of moisture in said channel is prevented, and whereby said tape is conditioned by passing over said guide, and pneumatic means to direct a jet of air into the lower end of said channel whereby an object in said channel is forced out of said channel and between said strips of tape.

References Cited in the file of this patent

UNITED STATES PATENTS

| Number | Name | Date |
|---|---|---|
| 272,355 | Tomlinson | Feb. 13, 1883 |
| 564,722 | Smyser | July 28, 1896 |
| 1,527,030 | Delamere | Feb. 17, 1925 |
| 1,823,995 | Streby | Sept. 22, 1931 |
| 1,970,396 | Scherer | Aug. 14, 1934 |
| 2,117,806 | Holmes | May 17, 1938 |
| 2,160,367 | Maxfield | May 30, 1939 |
| 2,200,971 | Sonneborn | May 14, 1940 |
| 2,222,011 | Zwoyer | Nov. 19, 1940 |
| 2,336,962 | Salfisberg | Dec. 14, 1943 |
| 2,340,260 | Clunan | Jan. 25, 1944 |
| 2,373,796 | Weidaner | Apr. 17, 1945 |
| 2,374,504 | Salfisberg | Apr. 24, 1945 |
| 2,420,982 | Salfisberg | May 20, 1947 |
| 2,497,212 | Donofrio | Feb. 14, 1950 |
| 2,553,095 | Jones | May 15, 1951 |
| 2,624,992 | Salfisberg | Jan. 13, 1953 |